United States Patent
Downey et al.

(10) Patent No.: US 10,374,933 B2
(45) Date of Patent: Aug. 6, 2019

(54) SYSTEMS AND METHODS FOR MONITORING OPERATIONAL STATUSES OF NETWORK SERVICES

(71) Applicant: Verizon Patent and Licensing Inc., Arlington, VA (US)

(72) Inventors: William S. Downey, Franklin, MA (US); Edward M. Eggerl, Maynard, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 249 days.

(21) Appl. No.: 14/815,664

(22) Filed: Jul. 31, 2015

(65) Prior Publication Data
US 2017/0034038 A1    Feb. 2, 2017

(51) Int. Cl.
*H04L 12/26* (2006.01)
*H04L 29/06* (2006.01)
(Continued)

(52) U.S. Cl.
CPC .......... *H04L 43/50* (2013.01); *H04L 41/5038* (2013.01); *H04L 43/12* (2013.01);
(Continued)

(58) Field of Classification Search
CPC ............... G06F 11/079; G06F 11/0775; G06F 11/3051; G06F 2009/45591; G06F 21/552;
(Continued)

(56) References Cited

U.S. PATENT DOCUMENTS 6,779,031 B1 *   8/2004 Picher-Dempsey ........................ H04L 41/0213 370/352
7,373,415 B1 *   5/2008 DeShan .................. H04L 43/50 709/231

(Continued)

FOREIGN PATENT DOCUMENTS

WO    WO-0206961 A2 *    1/2002    ....... H04L 29/12066

OTHER PUBLICATIONS

Psiber Data Systems Inc., "LANEXPERT Inline Gigabit Network Analyzer User-Guide", 2011.*
(Continued)

*Primary Examiner* — Kamal B Divecha
*Assistant Examiner* — Sandarva Khanal

(57) ABSTRACT

An exemplary method of monitoring operational statuses of network services includes a monitoring probe that is deployed in a media service network accessing test configuration data from a control server, testing the network services based on the test configuration data, determining operational statuses of the network services based on the testing, and reporting the operational statuses of the network service to the control server. In certain examples, the test configuration data indicates a media resource locator ("MRL") network service to be tested, and the monitoring probe accesses MRL data from the MRL network service and parses the MRL data to identify one or more additional network services to be tested. The monitoring probe tests the additional network services and reports the operational statuses of the additional network services to the control server.

20 Claims, 14 Drawing Sheets

(51) Int. Cl.
*H04L 12/24* (2006.01)
*H04L 29/08* (2006.01)

(52) U.S. Cl.
CPC ...... *H04L 65/4076* (2013.01); *H04L 65/4084* (2013.01); *H04L 67/02* (2013.01)

(58) Field of Classification Search
CPC ......... H04L 43/10; H04L 43/08; H04L 43/12; H04L 43/06; H04L 43/16; H04L 43/50; H04L 41/0645; H04L 41/0677; H04L 41/147; H04L 41/5012; H04L 41/5038; H04L 41/5032; H04L 41/509; H04L 45/02; H04L 65/4076
See application file for complete search history.

(56) References Cited

U.S. PATENT DOCUMENTS

| | | | | |
|---|---|---|---|---|
| 2008/0049623 A1* | 2/2008 | Qiu | .................... | H04L 41/0806 370/241 |
| 2008/0239972 A1* | 10/2008 | Omar | ................. | H04L 41/5009 370/250 |
| 2010/0223380 A1* | 9/2010 | Zheng | .................. | H04L 65/403 709/224 |
| 2010/0313230 A1* | 12/2010 | Van Doorn | ......... | H04L 65/4076 725/107 |
| 2011/0010585 A1* | 1/2011 | Bugenhagen | ....... | H04L 41/5022 714/32 |
| 2011/0314107 A1* | 12/2011 | Garcia | .................... | G06F 8/63 709/206 |
| 2013/0111008 A1* | 5/2013 | Black | ................... | H04L 43/028 709/224 |
| 2013/0275840 A1* | 10/2013 | Gilson | .................. | G06F 11/10 714/784 |
| 2014/0351412 A1* | 11/2014 | Elisha | ................. | H04L 41/0806 709/224 |
| 2015/0382208 A1* | 12/2015 | Elliott | ................... | G06F 16/245 370/252 |
| 2016/0006692 A1* | 1/2016 | Kako | ................. | H04L 63/1408 726/13 |
| 2016/0043919 A1* | 2/2016 | Connelly | ............... | H04L 41/28 709/220 |

OTHER PUBLICATIONS

Park, et al., "Real-Time Carousel Caching and Monitoring in Data Broadcasting", IEEE Transactions on Consumer Electronics, vol. 52, No. 1, Feb. 2006.*
Psiber Data Systems Inc., "LANEXPERT Inline Gigabit Network Analyzer User-Guide", 2011. (Year: 2011).*
Psiber Data Systems Inc., "LANExpert Inline Gigabit Network Analyzer User-Guide" (Year: 2011).*
Park, et al.,"Real-Time Carousel Caching and Monitoring in Data Broadcasting", IEEE Transactions on Consumer Electronics, vol. 52, No. 1, Feb. 2006 (Year: 2006).*
Goland, "Multicast and Unicast UDP HTTP Messages", Microsoft Corporation; Jun. 21, 1999. Internet Engineering Task Force, Internet Draft. (Year: 1999).*

* cited by examiner

| ID | VHO | Type | Service | URL | SSM | Response Time | Last Success | Status |
|---|---|---|---|---|---|---|---|---|
| 141 | 0 | http | HNM | https://www22.example.com/.../keepalive.aspx | | 0.31 | 2015-06-17 15:16:47Z | OK |
| 139 | 0 | http | Hydra | https://originvms.example.com/.../SSOLogin.aspx | | 0.31 | 2015-06-17 15:16:47Z | OK |
| 140 | 0 | http | Motive | http://originvms.example.com/.../keepalive.aspx | | 0.05 | 2015-06-17 15:16:47Z | OK |
| 22 | 0 | http | OSS | https://www33.example.com/.../VMSAPHandler | | 0.22 | 2015-06-17 15:16:47Z | OK |
| 138 | 0 | http | Splunk | https://originvms.example.com/.../CrashLoggerService.svc | | 0.09 | 2015-06-17 15:16:48Z | OK |
| 137 | 0 | http | WiFiConfig | http://hydracdn.example.net/.../UIPC_AutoProv_1.json | | 0.12 | 2015-06-17 15:16:48Z | OK |

Fig. 6

| ID | VHO | Type | Service | URL | SSM | Response Time | Last Success | Status |
|---|---|---|---|---|---|---|---|---|
| 141 | 0 | http | HNM | https://www22.example.com/.../keepalive.aspx | | 0.31 | 2015-06-17 15:16:47Z | OK |
| 139 | 0 | http | Hydra | https://originvms.example.com/.../SSOLogin.aspx | | 0.31 | 2015-06-17 15:16:47Z | OK |
| 140 | 0 | http | Motive | http://originvms.example.com/.../keepalive.aspx | | 0.05 | 2015-06-17 15:16:47Z | OK |
| 22 | 0 | http | OSS | https://www33.example.com/.../VMSAPHandler | | 0.22 | 2015-06-17 15:16:47Z | OK |
| 138 | 0 | http | Splunk | https://originvms.example.com/.../CrashLoggerService.svc | | 0.09 | 2015-06-17 15:16:48Z | OK |
| 137 | 0 | http | WiFiConfig | http://hydracdn.example.net/.../UIPC_AutoProv_1.json | | 0.12 | 2015-06-17 15:16:48Z | OK |
| 1 | 106 | MRL | MRL Server | http://gss2.example.net/.../mrl.xml | | 0.03 | 2015-06-17 15:16:48Z | OK |
| | | mrl-http | ipc-ap-ma.iip | https://gss2.example.com/.../ipc-ap-ma.iip | | 0.19 | 2015-06-17 15:16:50Z | OK |
| | | mrl-mc | ipc-ap-ma.iip | 203.0.113.1:50000 | 198.51.100.2 | 0.12 | 2015-06-17 15:16:51Z | OK |

Fig. 9

SYSTEMS AND METHODS FOR MONITORING OPERATIONAL STATUSES OF NETWORK SERVICES

BACKGROUND INFORMATION

A provider of a media service, such as a subscriber television service, typically operates network elements that provide network services in support of the media service. Examples of such network services include a video-on-demand service, an interactive media guide service, an end-user device management service, an emergency alert service, an authentication service, etc. Certain features and/or operations of the media service are dependent on the network services. Because of this dependency, the operational statuses of the network services affect the features and/or operations of the media service and, consequently, the end-user experience with the media service.

Accordingly, it is desirable to a provider of the media service to monitor, maintain, and/or improve the performance of the network services. While conventional tools for monitoring, maintaining, and/or improving the performance of network services help in this regard, there is room for improvement. For example, conventional tools are not equipped to efficiently monitor certain network services in a media service network that has diverse network elements providing a variety of different network services.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5-10 illustrate examples of test configuration data and test results data according to principles described herein.

DETAILED DESCRIPTION OF PREFERRED EMBODIMENTS

Figure 1:
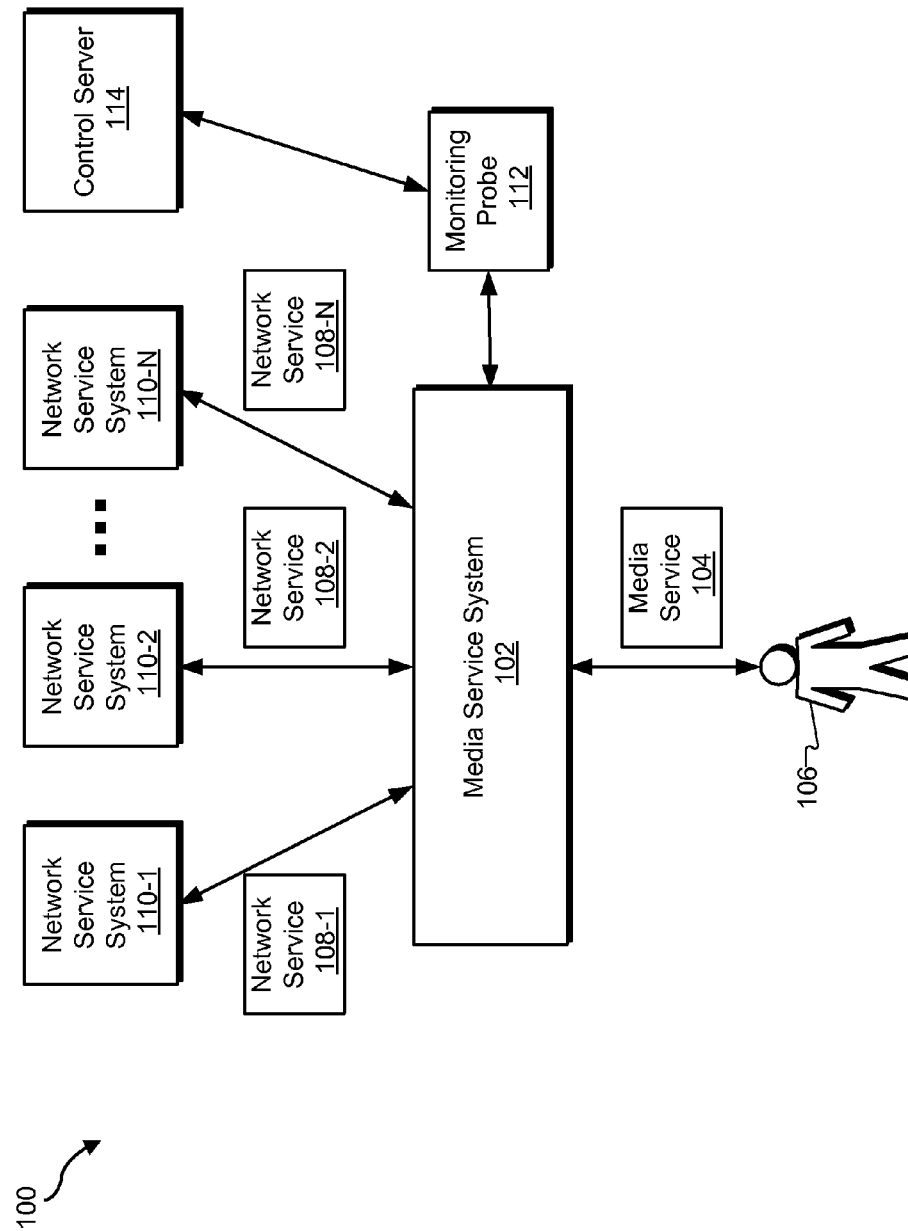
FIG. 1 illustrates an exemplary system for monitoring network services in a media service network according to principles described herein.

Exemplary systems and methods for monitoring operational statuses of network services are described herein. Exemplary systems and methods described herein may monitor network services in a media service network by periodically testing the network services, determining the operational statuses of the network services based on the testing, and reporting test results indicating the operational statuses of the network services. To this end, one or more monitoring probes may be deployed in the media service network. Each monitoring probe may periodically test network services in the media service network by accessing test configuration data from a control server, testing the network services based on the test configuration data, determining operational statuses of the network services based on the testing, and reporting the operational statuses of the network services to the control server.

The test configuration data may indicate a set of network services to be tested, service types of the network services, and/or resource addresses for the network services. A monitoring probe may use the test configuration data to perform various types of tests on different network services. For example, test configuration data may indicate a particular network service to be tested, a particular service type for the particular network service, and a particular resource address for the network service (e.g., a network address for a network element providing the network service). Based on the particular service type for the particular network service, the monitoring probe may identify and perform a particular type of test on the particular network service.

To illustrate one example, certain test configuration data may indicate a media resource locator ("MRL") network service to be tested, an MRL service type for the MRL network service, and an MRL address for the MRL network service (e.g., a network address for an MRL server providing the MRL network service). Based on this data, the monitoring probe may identify and perform an MRL test on the MRL network service. In certain examples, through the MRL test on the MRL network service, the monitoring probe may identify one or more additional network services to be tested (e.g., additional network services associated with the MRL service and not indicated in the test configuration data maintained by the control server), service types of the additional network services, and resource addresses for the additional network services. The monitoring probe may then test the additional network services.

As used herein, an MRL network service is a network service provided by an MRL server located at an MRL address in the media service network. To provide the MRL network service, the MRL server maintains MRL data, receives a request for the MRL data, and provides the MRL data in response to the request. In certain examples, the MRL server does this by maintaining an MRL file (e.g., an XML file), receiving a request for the MRL file, and providing the MRL file in response to the request. The MRL data indicates a set of network services associated with the MRL network service, service types of the network services associated with the MRL network service, and/or resource addresses for the network services associated with the MRL network service. For example, certain MRL data may indicate a set of additional network services (e.g., a plurality of objects such as code images available for download), service types of the additional network services (e.g., multicast or unicast service types), and/or resource addresses for the additional network services (e.g., network addresses for network elements that provide code images for download). In certain examples, an MRL may be a uniform resource identifier that may be used by a monitoring probe to identify and/or locate a network resource such as an MRL server and/or content served by the MRL server (e.g., a file, a data object, etc.) within a media service network. Examples of an MRL network service, network services associated with the MRL network service, testing the MRL network service, and identifying and testing network services associated with the MRL network service are described herein.

Because the test configuration data accessed from the control server indicates a set of network services to be tested, service types of the network services, and/or resource addresses for the network services, a monitoring probe and control server may monitor a variety of different network services provided by diverse network elements in a media service network. For example, the monitoring probe may perform an MRL test on an MRL network service, which may allow the monitoring probe and control server to monitor the MRL network service as well as one or more additional network services that are associated with the MRL network service and that may be identified through an MRL test on the MRL network service. This may be performed without the control server having to include data representative of the additional network services in the test configuration data maintained by the control server. In addition, a monitoring probe may check for and access any updated test configuration data from the control server for each test session, which may allow an operator of the control server to conveniently adjust the network services to be tested by changing the test configuration data at the control server. Similarly, an operator of an MRL server may update the MRL data in order to change the network services associated with the MRL service to be tested, without having to also update the test configuration data maintained by the control server.

The configuration and operation of the control server and monitoring probe, as described herein, may conserve resources and/or otherwise improve performance of the media service network, the control server, and/or the monitoring probe. For example, the footprint of the monitoring probe in the media service network may be minimized (e.g., by minimizing the power, processing, and/or memory resources used by the monitoring probe) during configuration, deployment, and/or operation of the monitoring probe. These and/or other benefits that may be provided by the exemplary systems and methods are described herein.

Examples of systems and methods for monitoring operational statuses of network services will now be described in reference to the accompanying drawings.

FIG. 1 illustrates an exemplary system 100 for monitoring operational statuses of network services in a media service network. As shown, system 100 may include, without limitation, a media service system 102 that provides a media service 104 to one or more end users of the media service 104, such as to end user 106, who may be a subscriber to, a customer of, or any other end user of the media service 104.

The media service 104 may include any service related to media content and provided to end users. For example, the media service 104 may include a media delivery service by way of which media content is delivered to end users, a subscription television service, a cable television service, a satellite television service, a video-on-demand service, a media streaming or download service, an over-the-top ("OTT") media delivery service, an Internet Protocol television ("IPTV") service, a package of different media services, a combination or sub-combination of these media services, or any other service related to media content and provided to end users.

Media service system 102 may include one or more devices included in and/or configured to form a media service network by way of which the media service 104 is provided to end users. For example, media service system 102 may include one or more server computing devices (e.g., application servers, web servers, media streaming servers, download servers such as media download servers and/or end-user-device code servers, authentication servers, interactive media guide servers, etc.), network connectivity devices (e.g., gateways, routers, optical terminal devices, etc.), data centers, media content processing devices, media hub offices (e.g., video hub offices ("VHOs")), media serving offices (e.g., video serving offices ("VSOs")), emergency alert system ("EAS") devices, carousels (e.g., media, data, and/or object carousels), media service head-end devices, media resource devices, end-user media service access devices (e.g., set-top box devices), network elements, physical computing devices, and/or any other devices included in and/or configured to form a media service network by way of which the media service 104 is provided to end users.

The media service 104 may include and/or otherwise be supported by one or more network services 108 (e.g., network services 108-1 through 108-N) provided by network service systems 110 (e.g., network service systems 110-1 through 110-N). Examples of network services 108 include, without limitation, authentication services (e.g., user and/or device authentication services), EAS services, media guide services (e.g., interactive media guide ("IMG") services), media-on-demand services (e.g., video-on-demand services), OTT media serving services, video serving services, audio serving services, network management services internal to a service provider network system, home network monitoring services, end-user device management (e.g., device provisioning, upgrade, code download, etc.) services, entitlement management services (e.g., license and/or key issuing services), and network connectivity services.

Network service systems 110 may each include one or more network elements configured to provide the network services 108. For example, network service systems 110 may include one or more devices (e.g., server devices, carousels, media resource devices, etc.) that are included in and/or connected to the media service network formed by media service system 102 and that provide the network services 108 in support of the media service 104. Network service systems 110 may include diverse network elements that provide a variety of different network services 108. Network services 108 may vary in one or more ways, such as by protocols used for the network services 108, types of network elements that provide the network services, ways in which the network services 108 are accessed and/or delivered, purposes for which the network services 108 are accessed (e.g., for end-user device provisioning or operation), network and/or geographic locations from which the network services 108 are provided and/or accessed, etc.

Performance of the media service 104 may depend on the performance of the network services 108. For example, if a network service 108 fails to operate as expected, the performance of the media service 104, in part or as a whole, may be adversely affected and may lead to an unsatisfactory end-user experience with the media service 104. Accordingly, it is desirable to maintain and/or improve the performance of the network services 108. To this end, system 100 may be configured to monitor the network services 108 in any of the ways described herein to facilitate maintenance and/or improvement of the performance and/or reliability of the network services 108.

As shown in FIG. 1, system 100 may include a monitoring probe 112 and a control server 114. Monitoring probe 112 and control server 114 may be configured to perform one or more operations to monitor the operational statuses of the network services 108 in any of the ways described herein. Examples of such operations, as well as components of control server 114 and monitoring probe 112, are described herein.

Figure 2:
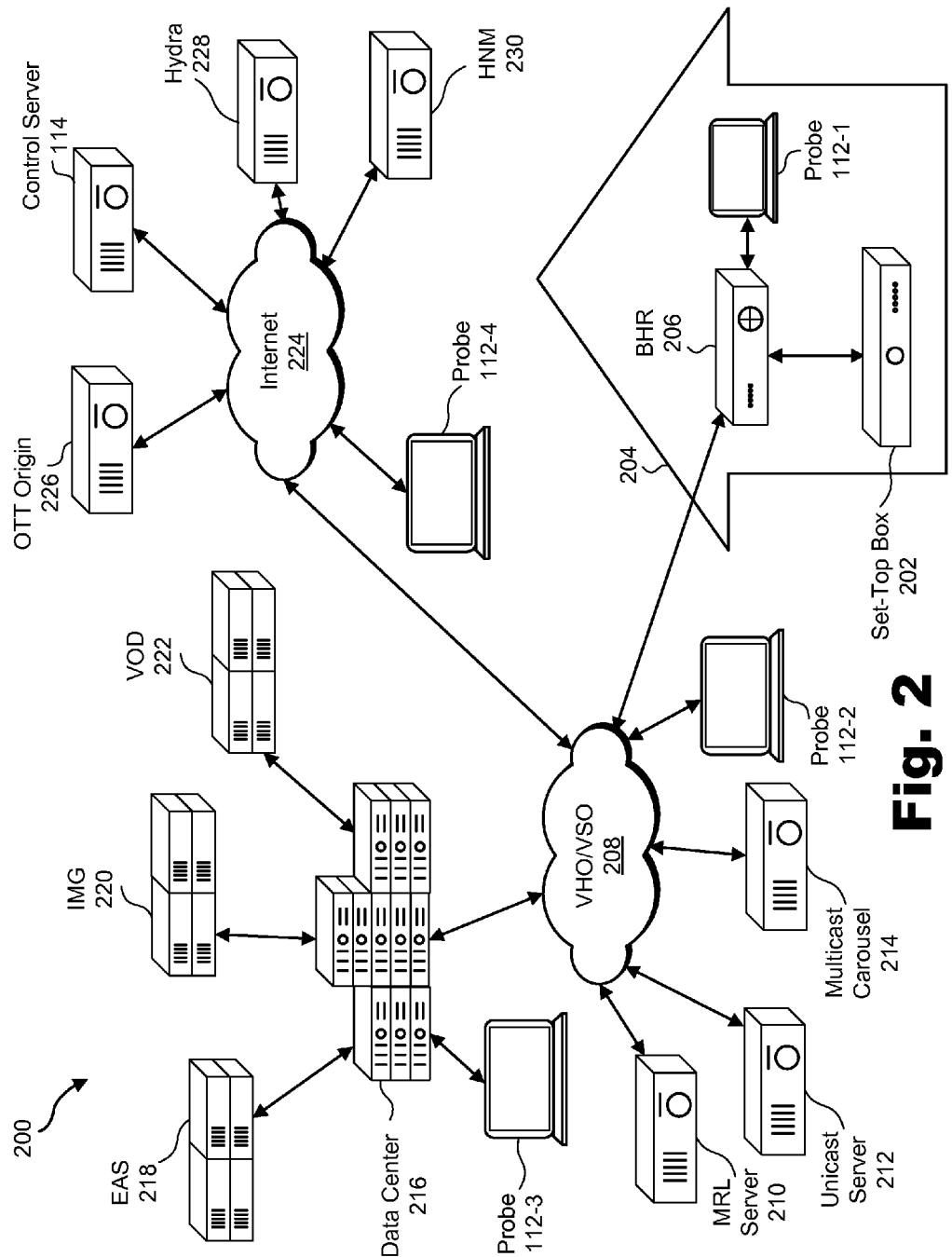
FIG. 2 illustrates an exemplary media service network system that implements network service monitoring according to principles described herein.

FIG. 2 illustrates an exemplary media service network system 200 ("system 200") that implements network service monitoring. System 200, which may be an exemplary implementation of system 100 shown in FIG. 1, may include a set of devices (e.g., network elements) configured to form a media service network by way of which a media service (e.g., media service 104) may be provided to end users of the media service. Elements of system 200 may be managed (e.g., operated and/or administered) by a provider of the media service. An end user of the media service may use one or more end-user media service access devices, such as a set-top box device 202 at a customer premises 204, to access the media service. In the illustrated example, set-top box device 202 is communicatively connected to and may access the media service through a broadband home router ("BHR") 206 at the customer premises 204. Set-top box device 202 and BHR 206 are illustrative of one exemplary configuration of end-user media service access devices. Any other suitable end-user media service access device and/or configuration of end-user media service access devices may access the media service in other examples.

Set-top box device 202, BHR 206, and/or customer premises 204 may be communicatively connected to one or more elements of the media service network that are remote from customer premises 204. For example, set-top box device 202, BHR 206, and/or customer premises 204 may be communicatively connected to one or more VHO and/or VSO elements 208 ("VHO/VSO 208") located at a VHO and/or VSO of the media service network. Through this connection, set-top box device 202 may access one or more features of the media service.

VHO/VSO 208 may be a particular VHO and/or VSO at a particular geographic location within the media service network. For example, VHO/VSO 208 may provide one or more features of the media service for access by end users located within particular geographic area. While FIG. 2 shows a single VHO/VSO 208, the media service network may include additional VHOs and/or VSOs serving other geographic areas.

VHO/VSO 208 may include and/or connect to one or more network elements that provide network services that support the media service. In system 200, for example, VHO/VSO 208 is communicatively connected to an MRL server 210, a unicast server 212, a multicast carousel 214, and a data center 216 that is connected to an EAS server 218, an IMG server 220, and a video-on-demand ("VOD") server 222. In addition, VHO/VSO 208 is communicatively connected, by way of a network such as the Internet 224, to an OTT origin server 226, a device management ("Hydra") server 228, and a home network monitor ("HNM") server 230.

MRL server 210 may provide an MRL service in support of the media service. The MRL server may provide the MRL service by maintaining MRL data, receiving a request for the MRL data (e.g., an MRL data file), and providing the MRL data in response to the request. The MRL data indicates a set of network services associated with the MRL network service, service types of the network services associated with the MRL network service, and/or resource addresses for the network services associated with the MRL network service. For example, the MRL data may include information about a unicast network service provided by unicast server 212 and a multicast network service provided by a multicast carousel 214, such as identifiers of the network services, service types of the network services (e.g., unicast and multicast types of network services), and resource addresses of unicast server 212 and multicast carousel 214. Unicast server 212 may provide any suitable unicast network service, such as a unicast code download service or a unicast media content delivery service. Multicast carousel 214 may provide any suitable multicast network service, such as a multicast code download service or a multicast media content delivery service.

To illustrate one example, set-top box device 202 may operate in accordance with firmware or other computing code installed and running on set-top box device 202. Set-top box device 202 may periodically check for code updates and download and install any updates that are relevant to set-top box device 202. To do this, set-top box device 202 may access the MRL service provided by MRL server 210 by communicating with MRL server 210 to request and receive MRL data. Set-top box device 202 may parse the MRL data to identify a plurality of code image objects and resource addresses from which the code image objects may be downloaded. If set-top box device 202 determines, from the MRL data, that a relevant code update is available, set-top box device 202 may use information in the MRL data to identify one or more resource addresses from which to download one or more code image objects. For instance, set-top box device 202 may use the MRL data to identify unicast server 212 as a unicast code download server from which a relevant code image object may be downloaded. Set-top box device 202 may then use an appropriate unicast communications protocol to communicate with unicast server 212 to download the relevant code image object. Additionally or alternatively, set-top box device 202 may use the MRL data to identify multicast carousel 214 as a multicast carousel that serves up a relevant code image object for download. Set-top box device 202 may then use an appropriate multicast communications protocol to join multicast carousel 214 to download the relevant code image object.

The MRL data served by MRL server 210 may indicate all code image objects associated with the media service network, such as all code image objects for various makes and models of end-user media service access devices. Set-top box device 202 may identify, from the MRL data, which code image objects are relevant to set-top box device 202. For example, the MRL data may indicate twenty different code image objects, and set-top box device 202 may determine that three of the twenty code image objects are relevant to set-top box device 202.

Data center 216 may include any configuration of network elements that provides one or more network services in support of the media service. For example, data center 216 may provide any content (e.g., content such as media programming information, media content metadata, and/or actual media content) for access by end-user media service access devices by way of the media service. In system 200, for instance, data center 216 may provide set-top box device 202 with access to network services provided by EAS server 218, IMG server 220, and VOD server 222.

EAS server 218 may provide a network service by providing emergency alert information for access through the media service. IMG server 220 may provide a network service by providing media guide data for access through the media service. VOD server 222 may provide a network service by providing video-on-demand content for access through the media service.

OTT origin server 226 may provide a network service by providing OTT streaming of media content for access through the media service. Device management server 228 may provide a network service by providing one or more end-user device management services and/or features to end-user devices. For example, device management server 228 may provide end-user device authentication services, entitlement services, provisioning services, and/or features to set-top box device 202. HNM server 230 may provide a network service by monitoring one or more elements of a home network at customer premises 204.

Network services provided by network elements illustrated in FIG. 2 may be diverse in one or more ways. For example, the network elements may provide the network service using different network communication protocols. For instance, a network element may provide a unicast network service using a unicast network protocol, and another network element may provide a multicast network service using a multicast protocol. In certain examples, one or more network elements may use hypertext transfer protocol ("HTTP") and/or hypertext transfer protocol secure ("HTTPS") to provide one or more network services (e.g., one or more unicast network services), one or more other network elements may use MRL formats or protocols to provide one or more other network services (e.g., one or more MRL network services), one or more other network elements may use multicast protocols (e.g., Internet Group Management Protocol ("IGMP"), Protocol Independent Multicast ("PIM") protocols, etc.) to provide one or more other network services (e.g., one or more multicast network services), and/or one or more other network elements may use socket connection protocols (e.g., Transmission Control Protocol ("TCP"), User Datagram Protocol ("UDP"), etc.) to provide one or more other network services (e.g., certain VOD network services).

Such a variety of network elements and/or network services provides certain challenges for comprehensively and efficiently monitoring the network services. Conventional monitoring tools are not well equipped to test such a variety of network services in a comprehensive, convenient, efficient, and/or non-intrusive manner.

System 200 may be configured to monitor the set of network services represented in FIG. 2. As shown, system 200 may include control server 114 and monitoring probes 112 (e.g., monitoring probes 112-1 through 112-4) deployed at various locations within the media service network. In the illustrated example, monitoring probes 112 are deployed at customer premises 204, at or connected to VHO/VSO 208, at or connected to data center 216, and at or connected to the Internet 224. This deployment configuration is illustrative only and not limited. One or more monitoring probes 112 may be deployed at one or more suitable locations within the media service network. Control server 114 and monitoring probes 112 may be configured to perform one or more of the operations described herein to monitor network services provided by network elements in the media service network. Examples of components and operations of control server 114 and monitoring probes 112 will now be described.

Figure 3:
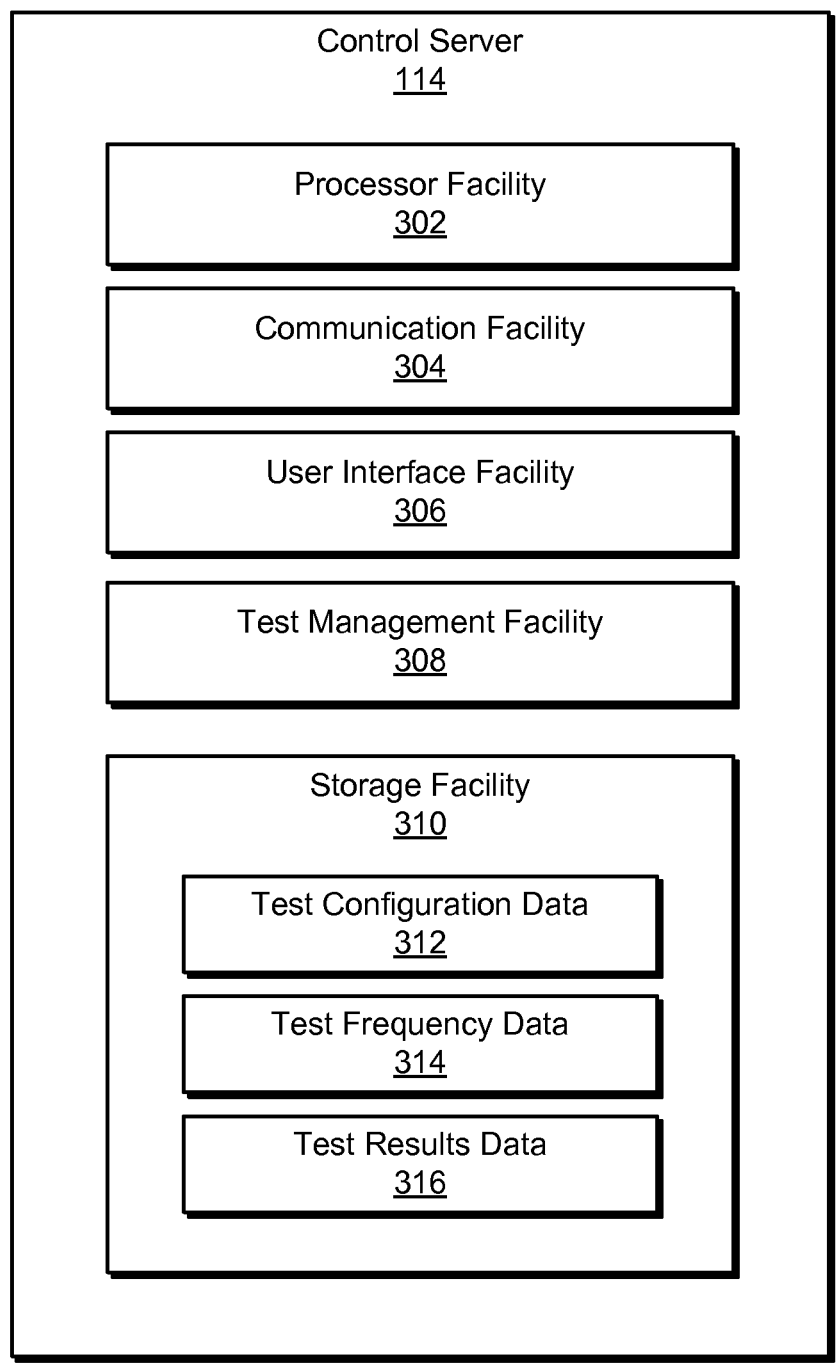
FIG. 3 illustrates exemplary components of a control server according to principles described herein.

FIG. 3 illustrates exemplary components of control server 114. As shown, control server 114 may include, without limitation, a processor facility 302, a communication facility 304, a user interface facility 306, a test management facility 308, and a storage facility 310. Facilities 302-310 may selectively communicate with one another using any suitable technologies. It will be recognized that although facilities 302-310 are shown to be separate facilities in FIG. 3, any of facilities 302-310 may be combined into fewer facilities, such as into a single facility, or divided into more facilities as may serve a particular implementation. One or more of facilities 302-310 may include or be otherwise implemented by one or more physical computing devices, such as a physical server device.

Storage facility 310 may be configured to store data generated and/or used by any of facilities 302-308. As shown, storage facility 310 may store test configuration data 312 representative of information (e.g., one or more test parameters) to be used by monitoring probe 112 to monitor network services. For example, test configuration data 312 may indicate a set of network services to be tested, service types of the network services, resource addresses for the network services, and/or any other information that may be used by monitoring probe 112 to test network services.

Storage facility 310 may also store test frequency data 314 representative of a frequency at which monitoring probe 112 is to conduct a test session. For example, test frequency data 314 may indicate a time interval (e.g., a period of time) between test sessions for use by monitoring probe 112 to determine when to initiate a test session based on when a most recent test session was initiated or completed.

Storage facility 310 may also store test results data 316 representative of results of tests conducted by one or more monitoring probes 112. For example, test results data 316 may represent operational statuses of network services that have been determined based on testing of the network services. Test results data 316 may represent test results obtained from a most-recently-conducted test session and/or from historical test sessions.

Storage facility 310 may store additional or alternative data as may serve a particular implementation. The data stored by storage facility 310 may be accessed by control server 114 from any suitable source, including a source internal or external to control server 114. Thus, while storage facility 310 is shown to be within control server 114 in FIG. 3, in alternative embodiments, storage facility 310 may be external of control server 114.

Storage facility 310 may permanently or temporarily store data. In certain examples, control server 114 may access certain data from a source external to control server 114 and temporarily store the data in storage facility 310 for use by one or more of facilities 302-308. In certain examples, data generated by one or more of facilities 302-308 and/or received from monitoring probes may be stored permanently or temporarily to storage facility 310.

Storage facility 310 may use any suitable technologies to store data. In certain examples, storage facility 310 may include or be implemented by any suitable non-transitory computer-readable medium (e.g., a physical computer memory).

Processor facility 302 may include any form of physical processor unit (e.g., at least one physical computer processor) that executes and/or directs control server 114 to perform one or more of the control server operations described herein. Processor facility 302 may execute and/or direct execution of operations as directed by communication facility 304, user interface facility 306, test management facility 308, and/or storage facility 310.

Communication facility 304 may include any communications interface and/or other technologies useful for communicating with and/or for facilitating communication between control server 114 and one or more other computing devices. For example, communication facility 304 may send and receive communications to/from monitoring probe 112 over one or more suitable communication connections. Communication facility 304 may use any suitable protocols and/or other technologies for communications with monitoring probe 112. In certain examples, communication facility 304 may use HTTPS for communications with monitoring probe 112.

User interface facility 306 may provide a user interface by way of which an operator of control server 114 may interface with control server 114. For example, through the user interface, the operator may define test configuration data 312, test frequency data 314, and/or any other information related to testing the network services 108. Additionally or alternatively, through the user interface, the operator may access test results data 316 indicative of the operational statuses of network services. User interface facility 306 may be configured to provide any suitable form of user interface, including a graphical user interface, for example.

Test management facility 308 may perform one or more operations to manage testing of network services by monitoring probe 112. For example, test management facility 308 may maintain test configuration data 312, test frequency data 314, and/or test results data 316. Test management facility 308 may maintain any other data that may be useful for testing of network services, such as data representing monitoring probes 112 (e.g., monitoring probe identifiers, internet protocol ("IP") addresses, media access control ("MAC") addresses, etc. of monitoring probes 112) deployed in the media service network.

Test management facility 308 may detect a reception, by control server 114 from monitoring probe 112, of a request for test configuration data 312. The request may be transmitted by monitoring probe 112 and received by control server 114 in any suitable way. The request may be an initial ping sent by monitoring probe 112 to control server 114 after monitoring probe 112 is deployed in the media service network, or a subsequent, specific request for test configuration data 312.

Test management facility 308 may direct control server 114 to provide test configuration data 312 to monitoring probe 112 in response to the request. The test configuration data 312 may be transmitted by control server 114 and received by monitoring probe 112 in any suitable way.

As part of directing control server 114 to provide test configuration data 312 to monitoring probe 112, test management facility 308 may identify the particular monitoring probe 112 from which the request was received. For example, the request may include information about the monitoring probe 112, such as an identifier (e.g., a name), IP address, and/or MAC address for the monitoring probe 112. Test management facility 308 may use this information to search data stored in storage facility 310 for a matching monitoring probe. For instance, test management facility 308 may look for a matching MAC address to identify the monitoring probe 112. After test management facility 308 identifies the monitoring probe 112, test management facility 308 may identify test configuration data 312 that is specific to the monitoring probe 112 and select that test configuration data 312 for transmission to the monitoring probe 112.

In certain examples, test management facility 308 may selectively provide test configuration data 312 to monitoring probe 112 based on an update status of the test configuration data 312. For example, in response to the request, test management facility 308 may determine whether the test configuration data 312 for the monitoring probe 112 has been updated since the test configuration data 312 was last provided to the monitoring probe 112. If the test configuration data 312 has been updated since it was last provided to the monitoring probe 112, test management facility 308 may direct control server 114 to provide the updated test configuration data 312 to the monitoring probe 112. If the test configuration data 312 has not been updated since it was last provided to the monitoring probe 112, test management facility 308 may refrain from directing control server 114 to provide the test configuration data 312 to the monitoring probe 112 and may direct control server 114 to send a message to the monitoring probe 112 to inform the monitoring probe 112 that the monitoring probe 112 already has the most up-to-date test configuration data 312.

Test management facility 308 may direct control server 114 to provide test frequency data 314 to monitoring probe 112 in response to the request. For example, test management facility 308 may direct control server 114 to provide a test interval instruction to monitoring probe 112 for use by monitoring probe 112 to determine when to initiate a test session.

In certain examples, test management facility 308 may selectively provide test frequency data 314 to monitoring probe 112 based on an update status of the test frequency data 314. For example, in response to the request, test management facility 308 may determine whether the test frequency data 314 for the monitoring probe 112 has been updated since the test frequency data 314 was last provided to the monitoring probe 112. If the test frequency data 314 has been updated since it was last provided to the monitoring probe 112, test management facility 308 may direct control server 114 to provide the updated test frequency data 314 to the monitoring probe 112. If the test frequency data 314 has not been updated since it was last provided to the monitoring probe 112, test management facility 308 may refrain from directing control server 114 to provide the test frequency data 314 to the monitoring probe 112 and may direct control server 114 to send a message to the monitoring probe 112 to inform the monitoring probe 112 that the monitoring probe 112 already has the most up-to-date test frequency data 314.

Test management facility 308 may detect that control server 114 has received test results data 316 from monitoring probe 112. Test management facility 308 may perform one or more operations on the test results data 316. For example, test management facility 308 may store test results data 316 in storage facility 310. Test management facility 308 may also manage which test results data 316 is stored and/or remains stored in storage facility 310. For instance, test management facility 308 may keep only test results data 316 for a most-recently-conducted test. Older test results data 316 may be deleted, archived, and/or used to generate one or more reports, such as a report useful to an operator of control server 114 to identify trends and/or patterns of network services in the media service network. In certain examples, test management facility 308 may perform automated trending analyses on the test results data 316 to identify one or more trends and/or patterns of networks services in the media service network.

Test results data 316 may indicate any information about network services that may be derived from the testing of the network services. In certain examples, test results data 316 may indicate any errors indicative of non-operational statuses of the network services.

Figure 4:
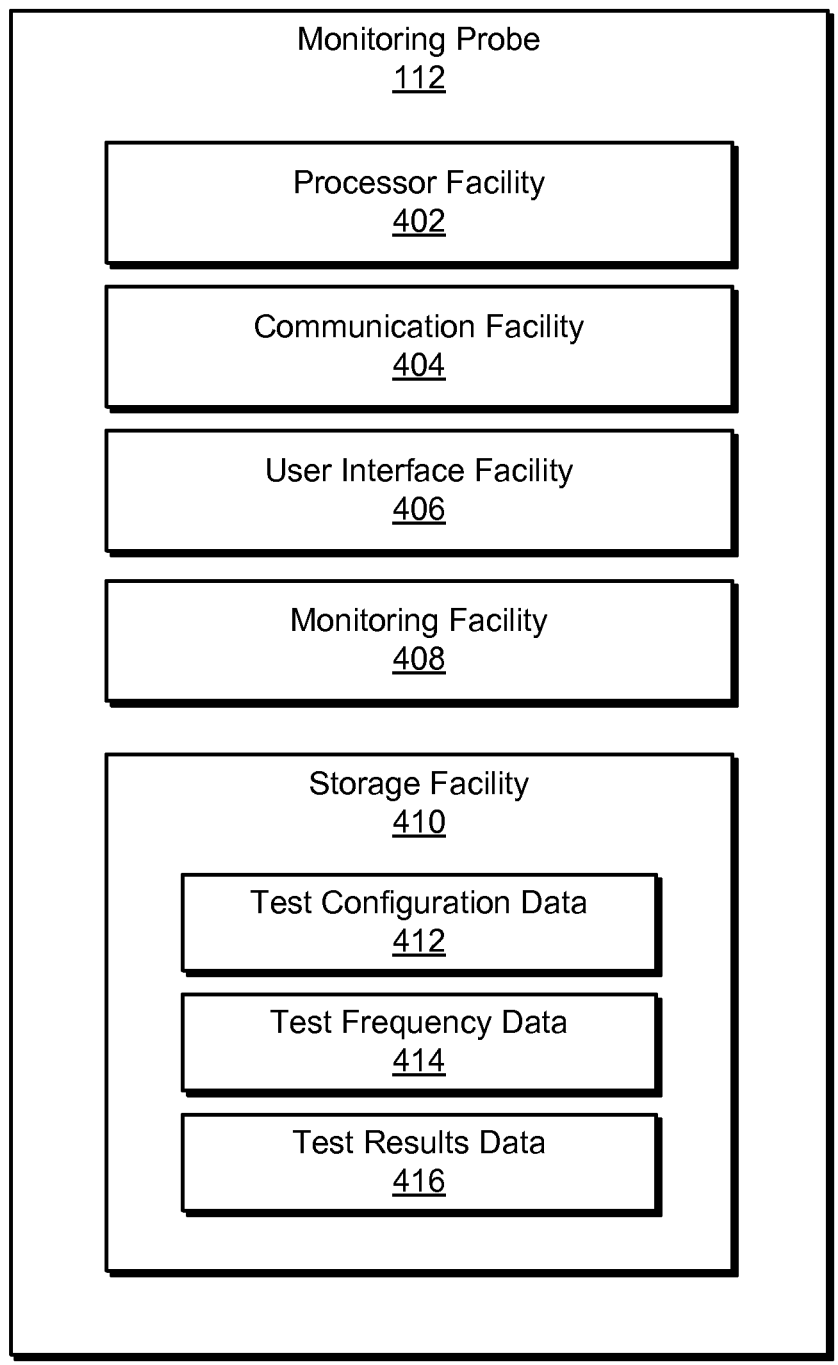
FIG. 4 illustrates exemplary components of a monitoring probe according to principles described herein.

FIG. 4 illustrates exemplary components of monitoring probe 112. As shown, monitoring probe 112 may include, without limitation, a processor facility 402, a communication facility 404, a user interface facility 406, a monitoring facility 408, and a storage facility 410. Facilities 402-410 may selectively communicate with one another using any suitable technologies. It will be recognized that although facilities 402-410 are shown to be separate facilities in FIG. 4, any of facilities 402-410 may be combined into fewer facilities, such as into a single facility, or divided into more facilities as may serve a particular implementation. One or more of facilities 402-410 may include or be otherwise implemented by one or more physical computing devices, such as a physical client computing device.

Storage facility 410 may be configured to store data generated and/or used by any of facilities 402-408. As shown, storage facility 410 may store test configuration data 412 representative of information (e.g., one or more test parameters) to be used by monitoring probe 112 to monitor network services. For example, test configuration data 412 may indicate a set of network services to be tested, service types of the network services, resource addresses for the network services, and/or any other information that may be used by monitoring probe 112 to test network services. Test configuration data 412 may represent a locally stored copy of test configuration data 312 received from control server 114.

Storage facility 410 may also store test frequency data 414 representative of a frequency at which monitoring probe 112 is to conduct a test session. For example, test frequency data 414 may indicate a time interval (e.g., a period of time) between test sessions for use by monitoring probe 112 to determine when to initiate a test session based on when the most recent test session was initiated or completed. Test frequency data 414 may represent a locally stored copy of test frequency data 314 received from control server 114.

Storage facility 410 may also store test results data 416 representative of results of tests conducted by monitoring probe 112. For example, test results data 416 may represent operational statuses of network services that have been determined based on testing of the network services by monitoring probe 112. Test results data 416 may represent test results obtained from a most-recently-conducted test session and/or from historical test sessions. Test results data 416 may represent a locally stored copy of test configuration data 312 provided by monitoring probe 112 to control server 114.

Storage facility 410 may store additional or alternative data as may serve a particular implementation. The data stored by storage facility 410 may be accessed by monitoring probe 112 from any suitable source, including a source internal or external to monitoring probe 112. Thus, while storage facility 410 is shown to be within monitoring probe 112 in FIG. 4, in alternative embodiments, storage facility 410 may be external of monitoring probe 112.

Storage facility 410 may permanently or temporarily store data. In certain examples, monitoring probe 112 may access certain data from a source external to monitoring probe 112 and temporarily store the data in storage facility 410 for use by one or more of facilities 402-408. In certain examples, data generated by one or more of facilities 402-408 and/or received from control server 114 may be stored permanently or temporarily to storage facility 410.

Storage facility 410 may use any suitable technologies to store data. In certain examples, storage facility 410 may include or be implemented by any suitable non-transitory computer-readable medium (e.g., a physical computer memory).

Processor facility 402 may include any form of physical processor unit (e.g., at least one physical computer processor) that executes and/or directs monitoring probe 112 to perform one or more of the monitoring probe operations described herein. Processor facility 402 may execute and/or direct execution of operations as directed by communication facility 404, user interface facility 406, monitoring facility 408, and/or storage facility 410.

Communication facility 404 may include any communications interface and/or other technologies useful for communicating with and/or for facilitating communication between monitoring probe 112 and one or more other computing devices. For example, communication facility 404 may send and receive communications to/from control server 114 over one or more suitable communication connections. Communication facility 404 may use any suitable protocols and/or other technologies for communications with control server 114. In certain examples, communication facility 404 may use HTTPS for communications with control server 114.

User interface facility 406 may provide a user interface by way of which an operator of monitoring probe 112 may interface with monitoring probe 112. For example, through the user interface, the operator may define test configuration data 412, test frequency data 414, identification information for monitoring probe 112, and/or any other information related to testing the network services 108. Additionally or alternatively, through the user interface, the operator may access test results data 416 indicative of the operational statuses of network services. User interface facility 306 may be configured to provide any suitable form of user interface, including a graphical user interface or a headless user interface (e.g., a console-based or test-based user interface), for example. User interface facility 406 may be omitted from certain implementations of monitoring probe 112.

Monitoring facility 408 may direct monitoring probe 112 to perform one or more operations to monitor network services in a media service network. For example, monitoring facility 408 may direct monitoring probe 112 to periodically initiate test sessions to test network services. Monitoring facility 408 may determine when to initiate a test session based on test frequency data 414.

As part of a test session, monitoring facility 408 may direct monitoring probe 112 to access test configuration data 312 from control server 114. For example, monitoring facility 408 may direct monitoring probe 112 to send a request for test configuration data 312 to control server 114. The request may include information about monitoring probe 112, such as an identifier, IF address, and/or MAC address of monitoring probe 112, for use by control server 114 to determine the identity of monitoring probe 112. Control server 114 may respond to the request by providing test configuration data 312 to monitoring probe 112, as described herein.

Monitoring facility 408 may detect a reception of the test configuration data 312 by monitoring probe 112 and perform one or more operations on the test configuration data 312. For example, monitoring facility 408 may store the test configuration data 312 to storage facility 410 as test configuration data 412 and use the test configuration data 412 to perform one or more operations to test network services.

Monitoring facility 408 may identify, from test configuration data 412, a set of network services to be tested. Monitoring facility 408 may also identify, from test configuration data 412, service types of the network services and, from the service types of the network services, types of tests to perform on the network services. Monitoring facility 408 may identify resource addresses for the network services from test configuration data 412 and may instruct monitoring probe 112 to direct the tests to the resource addresses. Examples of types of tests that may be performed by monitoring probe 112 will now be described.

Monitoring facility 408 may direct monitoring probe 112 to test certain types of network services using HTTP or HTTPS. This type of test may be referred to as an HTTP test. In certain examples, monitoring facility 408 may direct monitoring probe 112 to use an HTTP test to test a unicast service type of network service.

To perform an HTTP test, monitoring facility 408 may direct monitoring probe 112 to send an HTTP GET message to a resource address for a network service. Monitoring facility 408 may detect an HTTP response message received in response to the HTTP GET message. If the HTTP response message includes an HTTP response code that indicates success (e.g., an HTTP 200 response), monitoring facility 408 determines the status of the network service to be operational. If the HTTP response message includes any other HTTP response code (e.g., any HTTP response code other than HTTP 200), monitoring facility 408 determines the status of the network service to be non-operational and flags an error for the network service.

Monitoring facility 408 may direct monitoring probe 112 to test certain types of network services using one or more multicast protocols. This type of test may be referred to as a multicast test. In certain examples, monitoring facility 408 may direct monitoring probe 112 to use a multicast test to test a multicast service type of network service.

To perform a multicast test, monitoring facility 408 may direct monitoring probe 112 to send a join request, such as an IGMP or source-specific multicast ("SSM") join request, to a resource address for a network service and to wait a predetermined length of time to receive a UDP packet in response to the join request. If a UDP packet is received, monitoring facility 408 detects the receipt of the UDP packet and sends a leave request, such as an IGMP leave request, to the resource address for the network service. Based on the timely receipt of the UDP packet, monitoring facility 408 determines the status of the network service to be operational. If a UDP packet it not received within the predetermined length of time, monitoring facility 408 determines the status of the network service to be non-operational and flags an error for the network service.

Monitoring facility 408 may direct monitoring probe 112 to test certain types of network services using one or more socket connection protocols. This type of test may be referred to as a socket test. In certain examples, monitoring facility 408 may direct monitoring probe 112 to use a socket test to test a socket service type of network service (e.g., a telnet service type of network service).

To perform a socket test, monitoring facility 408 may direct monitoring probe 112 to attempt to open a socket connection (e.g., a telnet connection) with a resource address for a network service. Monitoring facility 408 may detect results of the attempt to open the socket connection. If a socket connection is successfully opened, monitoring facility 408 determines the network service to be operational and directs monitoring probe 112 to close the socket connection. If a socket connection is not successfully opened, monitoring facility 408 determines the network service to be non-operational and flags an error for the network service.

Monitoring facility 408 may direct monitoring probe 112 to test certain types of network services using MRL protocols. This type of test may be referred to as an MRL test. In certain examples, monitoring facility 408 may direct monitoring probe 112 to use an MRL test to test an MRL service type of network service.

To perform an MRL test, monitoring facility 408 may direct monitoring probe 112 to attempt to access MRL data from a resource address for a network service. For example, monitoring facility 408 may direct monitoring probe 112 to request an MRL file from the resource address for the network service. If MRL data is successfully accessed from the resource address, monitoring facility 408 determines the network service to be operational. If MRL data is determined not to be accessible at the resource address, monitoring facility 408 determines the network service to be non-operational and flags an error for the network service.

When MRL data is successfully accessed, monitoring facility 408 may parse the MRL data to identify a set of network services associated with the MRL network service. This set of network services may be referred to as an additional set of network services not indicated in the test configuration data 312 accessed from control server 114. In certain examples, the additional network services may include a group of multicast services, a group of unicast services, or a group of both unicast and multicast services. To illustrate, the additional network services may include a group of multicast services that provide distinct instances of code image objects for download, a group of unicast services that provide distinct instances of code image objects for download, or a group of both unicast and multicast services that provide distinct instances of code image objects for download. The MRL data may indicate a set of additional network services to be tested, service types of the additional network services, resource addresses for the additional network services, and/or any other information about the additional network services.

In certain examples, monitoring facility 408 may direct monitoring probe 112 to add the MRL data to test configuration data 412. For example, monitoring facility 408 may direct monitoring probe 112 to add, within test configuration data 412, data representative of the set of additional network services to be tested to the set of network services to be tested initially indicated in test configuration data 412, service types of the additional network services to the service types of the set of network services initially indicated in test configuration data 412, and resource addresses for the additional network services to the resource addresses for the set of network services initially indicated in test configuration data 412.

Monitoring facility 408 may direct monitoring probe 112 to test the set of additional network services indicated by the MRL data. Monitoring facility 408 may direct monitoring probe 112 to identify and perform appropriate types of tests on the additional network service in any of the ways described herein. For example, if the additional network services include a multicast network service to be test, monitoring facility 408 may direct monitoring probe 112 to perform a multicast test of the multicast network service as described herein. For instance, the multicast network service may be provided by a multicast data carousel that multicasts a code image for download by an end-user media service access device, and monitoring facility 408 may direct monitoring probe 112 to send a join request to a network address of the multicast data carousel and wait a predetermined length of time to start receiving data packets from the network address.

After monitoring probe 112 has tested network services and determined operational statuses of the network services as described above, monitoring facility 408 may direct monitoring probe 112 to report test results (e.g., operational statuses of the network services) to control server 114. Monitoring probe 112 may report the test results to control server 114 in any suitable way and/or format.

An exemplary deployment and operation of a monitoring probe will now be described. Specific examples of test configuration data and MRL data will also be described in relation to the deployment and operation of the monitoring probe.

A monitoring probe may be deployed at a location within a media service network. When the monitoring probe starts executing, the monitoring probe sends an initial message to a control server. To this end, information identifying the control server may be prepopulated in the monitoring probe and used by the monitoring probe to initiate communication with the control server. In certain examples, the data stored by the monitoring probe to identify the control server associated with the monitoring probe may be changed by way of a configuration user interface provided by the monitoring probe.

The control server may use information in the message received from the monitoring probe, such as a probe identifier, IP address, and/or MAC address of the monitoring probe, to register the monitoring probe with the control server. The registration may include adding information about the monitoring probe into a database maintained by or otherwise accessible to the control server.

After the control server registers or identifies the monitoring probe, the control server may provide test configuration data and/or test frequency data to the monitoring probe, such as described herein. In certain examples, the monitoring probe may not be assigned to any particular VHO in the media service network. In such examples, the control server may detect that the monitoring probe is not assigned to any particular VHO and may provide test configuration data that indicates only a set of network services that are common to all VHOs in the media service network.

Figure 5:

FIG. 5 illustrates an example of such test configuration data. As shown, FIG. 5 illustrates a table 500 that includes rows that represent network services to be tested and columns of information about the network services. Column 502 includes identifiers ("IDs") for the network services, column 504 includes VHO assignment information for the network services, column 506 includes service type information for the network services, column 508 includes names for the network services, and column 510 includes resource address information for the network services. As shown in column 504, each network service represented in table 500 is assigned a VHO value of "0," which indicates that the network service is common to all VHOs and/or not assigned to one particular VHO in the media service network. As shown in column 506, each network service represented in table 500 is of an HTTP service type. The monitoring probe may use the information in table 500 to test the network services indicated in table 500 and report the results to the control server, such as described herein.

In certain examples, the monitoring probe may report test results by adding test results data (e.g., response time information, last success timestamp information, error information, operational status information, etc.) to table 500 and sending the updated table 500 to the control server. FIG. 6 illustrates a table 600 that is similar to table 500 and also includes test results information. As shown, column 602 includes test response time information, column 604 includes last success timestamp information, and column 606 includes operational status information. In the illustrated example, column 606 indicates that each network service has been determined to have an operational status indicating that the network service is functioning properly.

This initial accessing of test configuration data, testing of network services indicated by the test configuration data, and reporting test results data by the monitoring probe may be an initial test session performed by the monitoring probe. The monitoring probe may be configured to periodically (e.g., every fifteen minutes) initiate subsequent test sessions in accordance with test frequency data prepopulated in the monitoring probe or received from the control server.

In certain examples, the monitoring probe may be assigned to a specific VHO in the media service network. The assignment may be made manually by an operator of the control server or automatically by the control server. The control server may be configured to automatically assign the monitoring probe to a specific VHO based on information about the monitoring probe that is accessible to the control server, such as information indicative of a location of the monitoring probe relative to VHOs in the media service network.

When the monitoring probe next initiates a test session after the assignment of the monitoring probe to a specific VHO has been made, the monitoring probe sends a message to the control server to request any updated test configuration data. The control server receives the message and detects that the monitoring probe is assigned to the specific VHO. Based on the detected assignment, the control server sends updated test configuration data to the monitoring probe. The updated test configuration data may indicate one or more network services that are specific to the assigned VHO and included in the updated test configuration data because the monitoring probe is assigned to the VHO.

Figure 7:
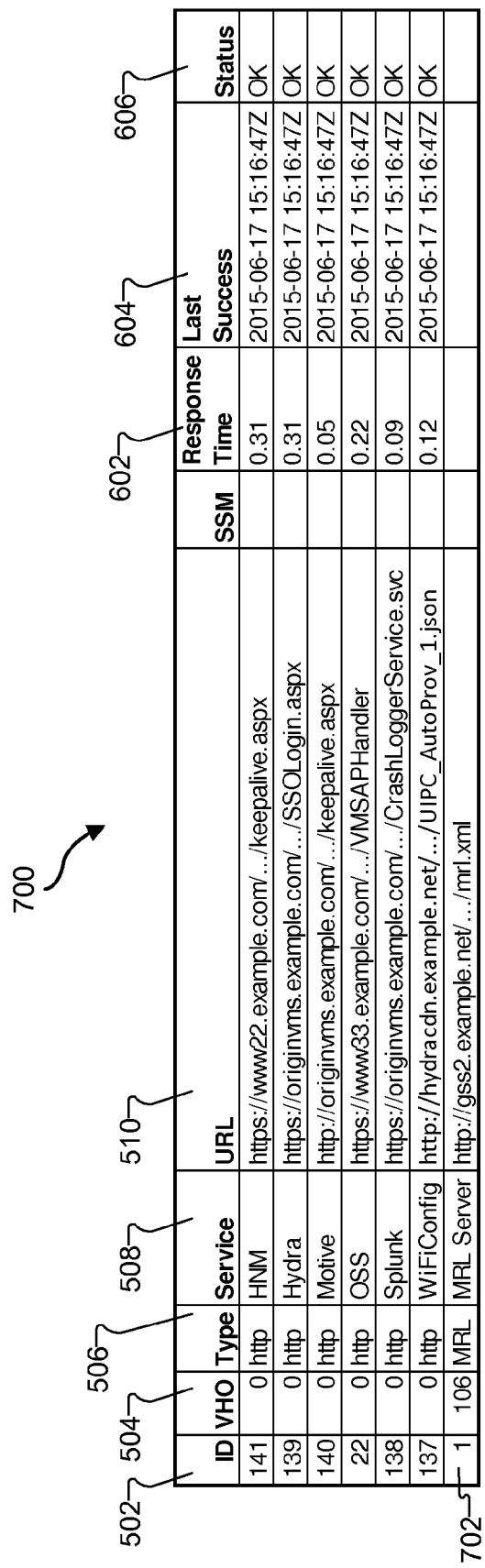

The monitoring probe receives the updated test configuration data and uses it to update the locally stored test configuration data. FIG. 7 illustrates an example of the updated test configuration data. As shown, FIG. 7 illustrates a table 700 that includes rows that represent network services to be tested and columns of information about the network services. Table 700 is like table 600 of FIG. 6 and additionally includes a row 702 of information that has been added to represent a VHO-specific network service that has been added to the set of network services to be tested. As shown, the information for the VHO-specific network service in column 504 indicates a VHO (e.g., "VHO 106") to which the network service is specific. The information in column 506 indicates that the VHO-specific network service is of an MRL service type.

The monitoring probe may use the information in table 700 to test the network services indicated in table 700 and report the results to the control server, such as described herein. In certain examples, the monitoring probe may report test results by adding test results data (e.g., response time information, last success timestamp information, error information, operational status information, etc.) to table 700 and sending the updated table 700 to the control server.

In the illustrated example in which one of the network services is an MRL network service, the monitoring probe may perform an MRL test of the MRL network service as described herein, including accessing MRL data from an MRL server at the resource address listed in column 510 for the MRL network service.

The monitoring probe may parse the MRL data (e.g., an extensible markup language ("XML") file of MRL data) to identify one or more additional network services that are associated with the MRL network service. In certain examples, the additional network services may include code objects that are served up by network elements in the media service network. For example, the additional network services may include a code object served up by a unicast code download server and a code object (the same or a different code object) served up by a multicast carousel for access and download by end-user media service access devices.

Figure 8:
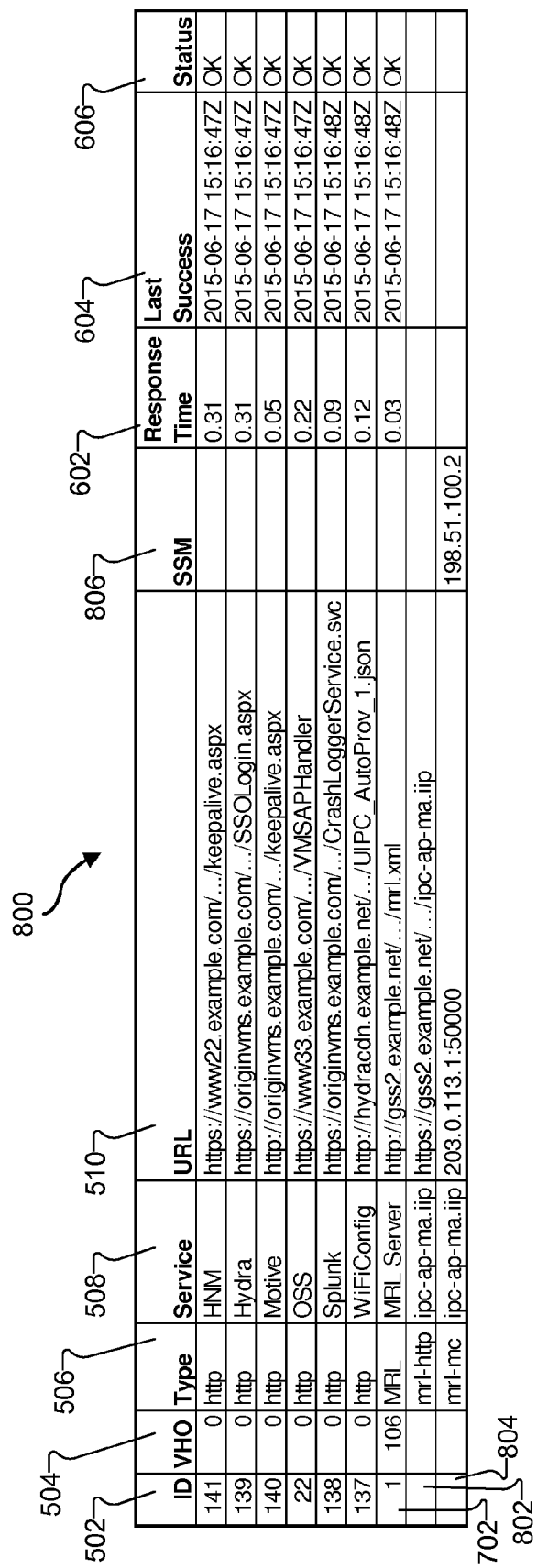

The monitoring probe may update table 700 by adding information about the additional network services (e.g., code objects) identified from the MRL data. FIG. 8 illustrates a table 800 that is similar to table 700 and additionally includes test results information for the MRL network service in columns 602, 604, and 606, as well as rows 802 and 804 of information about the additional network services identified from the MRL data. In the illustrated example, row 802 includes information indicating a network service that is a unicast code object served up by a unicast code download server at a particular network resource address, and row 804 includes information indicating a network service that is a multicast code object served up by a multicast carousel at a particular network resource address. Information in column 506 (e.g., "mrl-http") indicates that the unicast code object is a unicast service type associated with the MRL service represented in row 702, and information in column 506 (e.g., "mrl-mc") indicates that the multicast code object is a multicast service type associated with the MRL service represented in row 702. Information in column 806 indicates source-specific multicast ("SSM") information (e.g. an SSM destination address) for the multicast code object represented in row 804.

The monitoring probe may test the additional network services as described herein. For the unicast code object represented in row 802 of table 800, the monitoring probe may send an HTTP request to download the code object from the resource address for the unicast code object. If the monitoring probe successfully downloads the entire unicast code object (which may be indicated by monitoring probe receiving an HTTP 200 response code from the resource address), the monitoring probe will determine the status of the unicast code object to be operational. If the monitoring probe is unable to successfully download the entire unicast code object (which may be indicated by monitoring probe receiving any HTTP response code other than an HTTP 200 response code from the resource address), the monitoring probe will determine the status of the unicast code object to be non-operational and flag an error (e.g., an HTTP error code with a description).

For the multicast code object represented in row 804 of Table 800, the monitoring probe may join a multicast carousel (e.g., a digital storage media command and control ("DSM-CC") multicast carousel) located at the resource address for the multicast code object and wait to receive a UDP packet. If a UDP packet is received, the monitoring probe may leave the multicast carousel and determine the status of the multicast code object to be operational. If the monitoring probe is unable to join the multicast carousel or if a UDP packet is not received within a predetermined length of time, the monitoring probe may determine the status of the multicast code object to be non-operational and flag an error (e.g., a .NET multicast/UDP error code with a description).

The monitoring probe may add test results data for the unicast and multicast code objects to table 800. FIG. 9 illustrates a table 900 that is similar to table 800 and also includes test results information for the unicast and multicast code objects. As shown, column 602 includes test response time information, column 604 includes last success timestamp information, and column 606 includes operational status information for the unicast and multicast code objects. In the illustrated example, column 606 indicates that each of the unicast and multicast code objects has been determined to have an operational status indicating that the network service is functioning properly.

After the monitoring probe has finished testing all network services (e.g., all network service indicated in table 900), the monitoring probe may report the test results to the control server. For example, the monitoring probe may send data representative of table 900 to the control server. The monitoring probe may then go into a sleep or standby mode for the duration of the defined test iteration time interval. The monitoring probe may initiate and perform another test session based on the defined test iteration time interval.

In certain examples, the monitoring probe uses a signing algorithm when transmitting data to the control server. For example, the monitoring probe may use a standards-based uniform resource locator ("URL") signing algorithm to authenticate the monitoring probe to the control server. This may help prevent spoofing of a monitoring probe.

The control server may receive and store the test results. The control server may aggregate and manage the test results received from one or more monitoring probes. In certain examples, the control server may maintain two files of test results data for a monitoring probe, such as a file of most-recent test results from the most recent test session performed by the monitoring probe and a file of daily test results that are accumulated from test sessions performed during a day.

As mentioned, the control server may provide a user interface (e.g., a monitoring portal user interface) by way of which an operator of the control server (or any other user with access rights) may access test results data, such as one or more reports of test results data that may be generated by the control server. A report may include any suitable combination of test results data and may be presented to a user in any suitable way.

Figure 10:

FIG. 10 illustrates an exemplary monitoring portal graphical user interface 1000 ("GUI 1000") that the control server may present to a user. As shown, GUI 1000 may include information about the monitoring probe, such as a hostname, a MAC address, an IP address, a gateway router ("GWR"), a test session start time, a monitoring probe code version, a control server identifier, a VHO assignment, a test interval, a timestamp indicating when the test interval used by the monitoring probe was last updated, a timestamp indicating when the test configuration data of the monitoring probe was last updated, a number of test sessions performed by the monitoring probe, a cycle time of a test session, etc. GUI 1000 may also include test results data received from the monitoring probe, such as a presentation of table 900, as shown.

Figure 11:
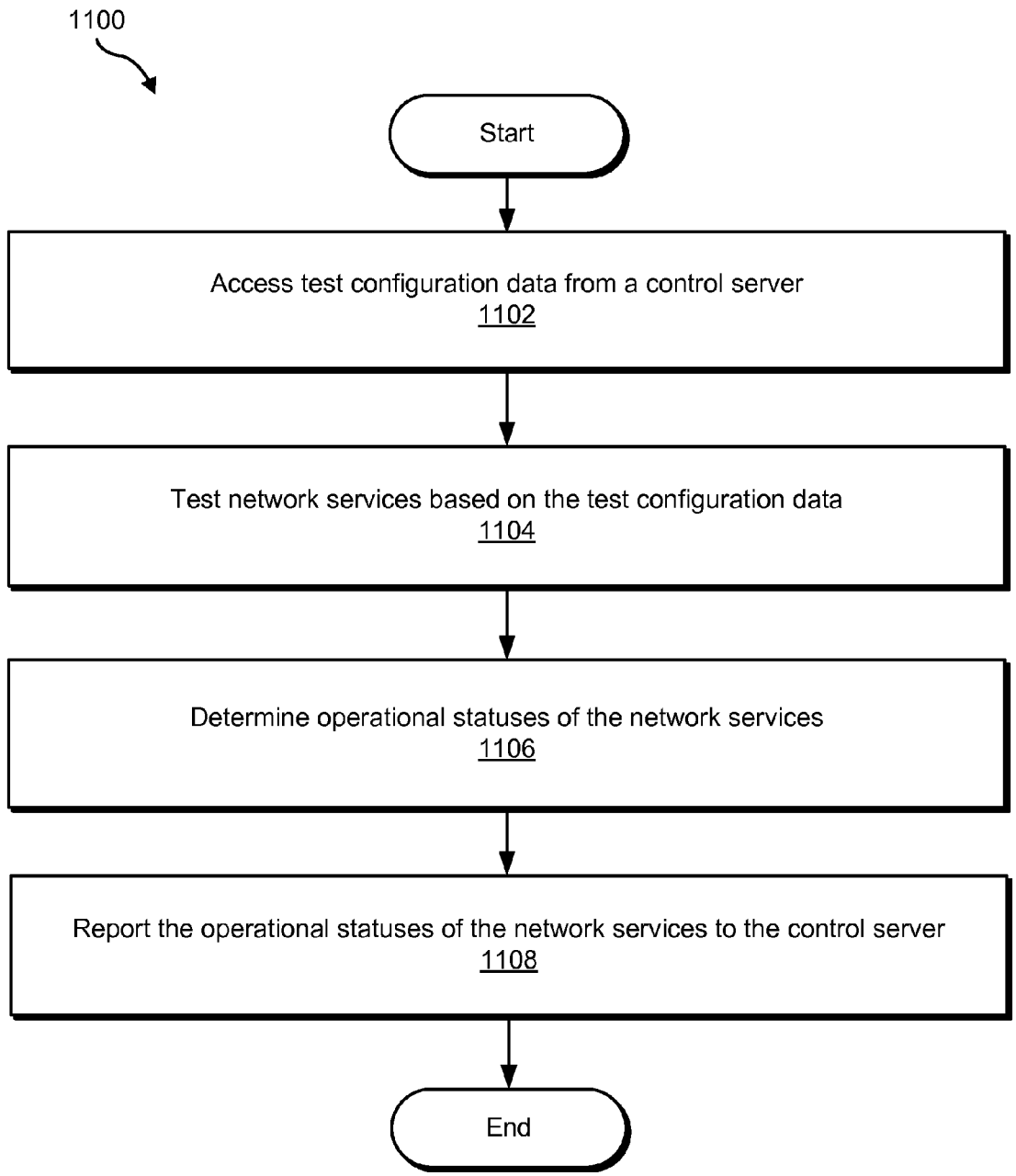
FIGS. 11-13 illustrate exemplary methods for monitoring network services according to principles described herein.
Figure 12:
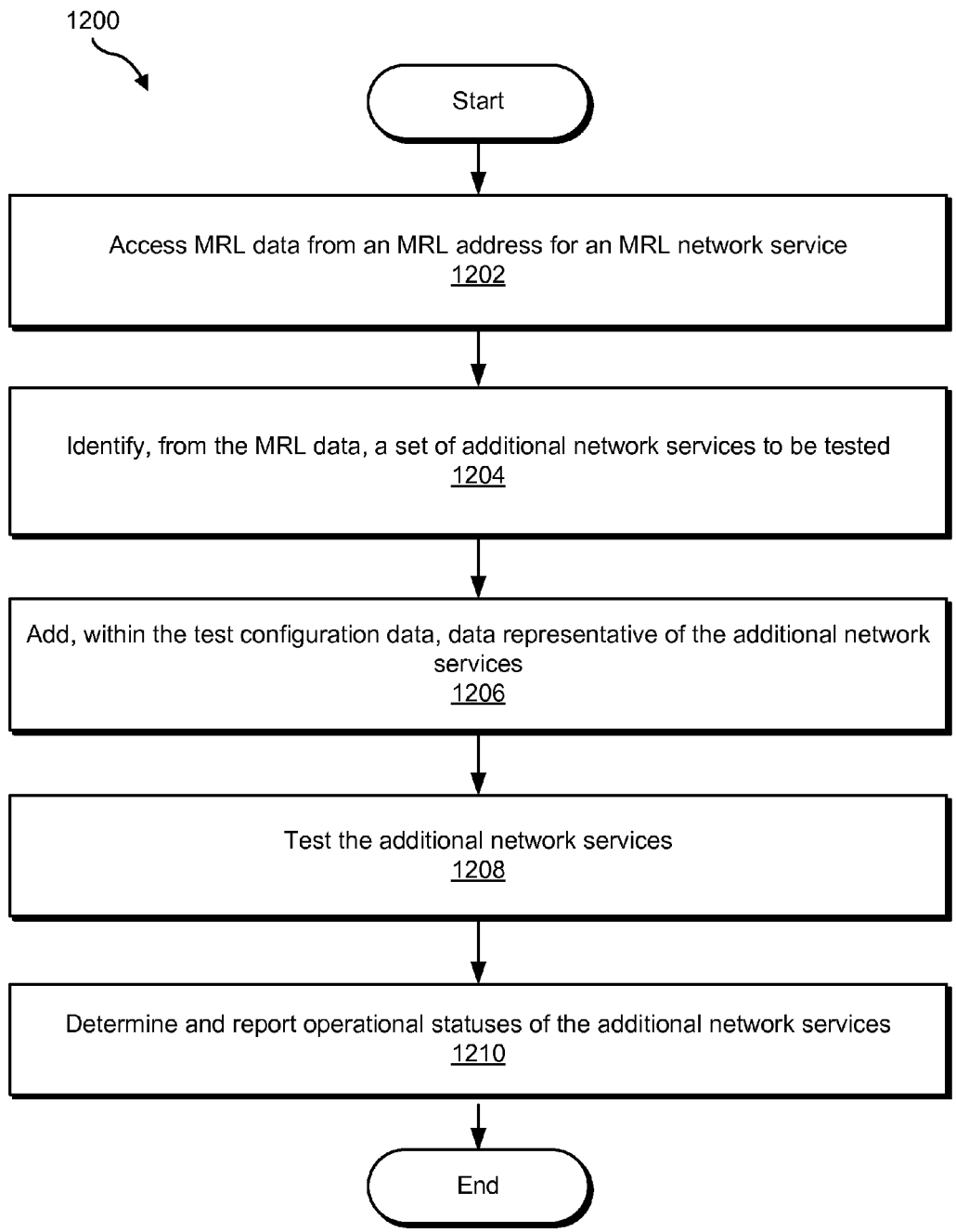
Figure 13:
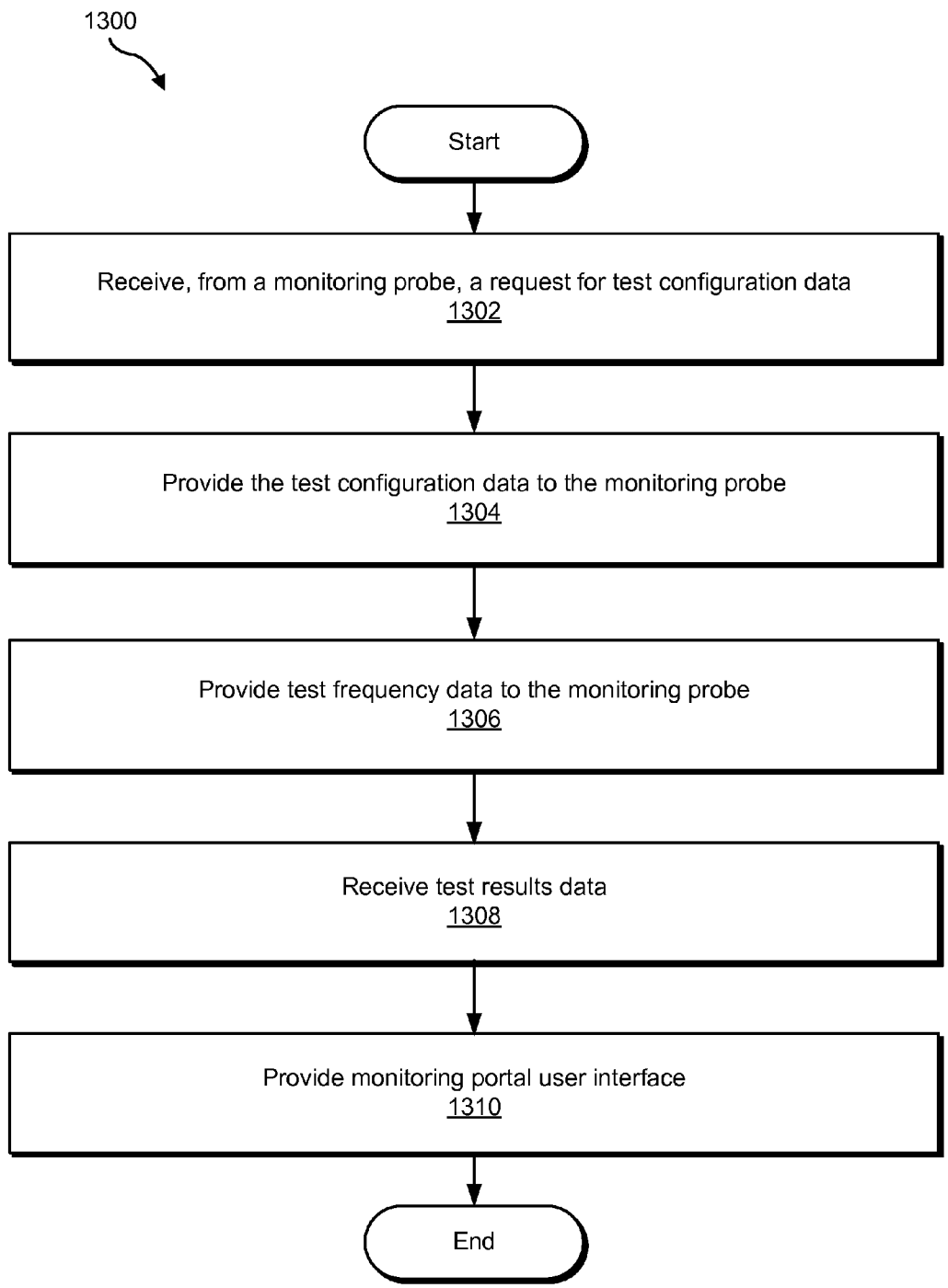

FIGS. 11-13 illustrate exemplary methods 1100-1300 for monitoring network services. While FIGS. 11-13 illustrate exemplary operations according to certain embodiments, other embodiments may omit, add to, reorder, combine, and/or modify any of the operations shown in FIGS. 11-13. One or more of the operations shown in FIGS. 11-13 may be performed by components of monitoring probe 112 and/or control server 114.

Turning to method 1100, in operation 1102, a monitoring probe accesses test configuration data from a control server, such as described herein.

In operation 1104, the monitoring probe tests network services based on the test configuration data. For example, the monitoring probe may test a set of network services indicated by the test configuration data, such as described herein.

In operation 1106, the monitoring probe determines operational statuses of the network services based on the testing, such as described herein.

In operation 1108, the monitoring probe reports the operational statuses of the network services to the control server, such as described herein. The monitoring probe may also report any other test results data to the control service, as described herein.

Turning to method 1200, in operation 1202, a monitoring probe accesses MRL data from an MRL address for an MRL network service, such as described herein.

In operation 1204, the monitoring probe identifies, from the MRL data, a set of additional network services to be tested, such as described herein.

In operation 1206, the monitoring probe adds, within the test configuration data, data representative of the additional network services, such as described herein.

In operation 1208, the monitoring probe tests the additional network services, such as described herein.

In operation 1210, the monitoring probe determines and reports operational statuses of the additional network services to a control server, such as described herein.

Method 1200 may be performed as part of and/or in addition to method 1100 when the test configuration data in method 1100 indicates an MRL network service to be tested, such as described herein. In alternative examples, method 1100 may be performed without method 1200 being performed, such as when a set of network services indicated by the test configuration data in method 1100 does not indicate an MRL network service to be tested, or when a set of network services indicated by the test configuration data in method 1100 indicates an MRL network service to be tested as well as the additional network services that are associated with the MRL network service and are to be tested.

Turning to method 1300, in operation 1302, a control server receives a request for test configuration data from a monitoring probe, such as described herein.

In operation 1304, the control server provides the test configuration data to the monitoring probe, such as described herein.

In operation 1306, the control server provides test frequency data to the monitoring probe, such as described herein.

In operation 1308, the control server receives test results data 1308 from the monitoring probe, such as described herein.

In operation 1310, the control server provides a monitoring portal user interface, such as described herein.

Certain illustrative examples described herein are directed to test sessions being periodically initiated in accordance with test frequency data. The frequency and/or duration of test sessions may be defined to be any suitable value as may suit a particular implementation. Such values may facilitate real-time or near-time testing of network services.

In certain examples, a monitoring probe may be configured to continuously monitor one or more network services and to detect any change in the network services and/or test results. For example, the monitoring probe may continuously monitor a MRL network service and/or a multicast network service and detect any change in the MRL network service and/or the multicast network service. When a change is detected, the monitoring probe may log the change (e.g., based on a transaction ID). The monitoring probe may save a copy of each detected change (e.g., a new MRL resource). The monitoring probe may report test results to the control server in any suitable way, such as in real time or periodically in near time. Real-time testing and reporting may facilitate more granular analysis of test results data as compared to near-time testing and reporting.

In certain embodiments, one or more of the processes described herein may be implemented at least in part as instructions embodied in a non-transitory computer-readable medium and executable by one or more specifically-configured computing devices. In general, a processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), an Electrically Erasable PROM ("EEPROM"), a Flash EEPROM ("FLASH-EEPROM"), any other memory chip or cartridge, or any other tangible medium from which a computer can read.

Figure 14:
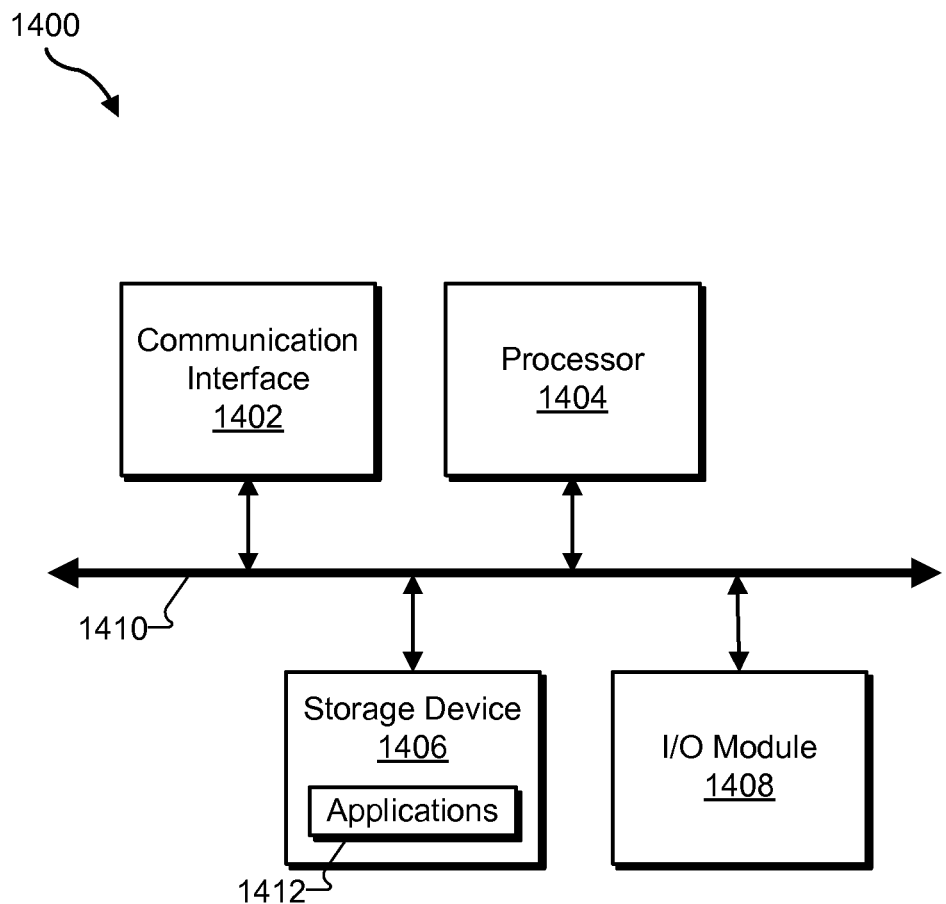
FIG. 14 illustrates an exemplary computing device according to principles described herein.

FIG. 14 illustrates an exemplary computing device 1400 specifically configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional, fewer, or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may execute and/or direct execution of operations as directed by one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1406. For example, data representative of one or more applications 1412 configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., a radio frequency ("RF") or infrared receiver), and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions of test management facility 308 of control server 114 or monitoring facility 408 of monitoring probe 112. Likewise, storage facility 310 or storage facility 410 may be implemented by or within storage device 1406.

One or more of the systems, methods, elements, operations, etc. described herein may improve operation and/or performance of computing device 1400, such as by conserving processing and/or memory resources of computing device 1400, conserving network resources used by computing device 1400, and/or by providing for efficient operation of computing device 1400, for example.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   accessing, by a monitoring probe deployed in a media service network that provides a set of network services, via a plurality of network service devices, to a plurality of end users, test configuration data from a control server, the test configuration data indicating the set of network services to be tested, service types of the network services, and resource addresses for the network services, wherein:
      the set of network services includes a media resource locator network service to be tested,
      the service types of the network services include a media resource locator service type for the media resource locator network service, and
      the resource addresses for the network services include a media resource locator address for a media resource locator server that provides the media resource locator network service;
   testing, by the monitoring probe and based on the test configuration data, the network services to determine operational statuses of the network services and to determine whether a media resource locator file is accessible at the media resource locator address of the media resource locator server, wherein the media resource locator server provides the media resource locator network service in support of at least one of the set of network services by receiving a request for media resource locator data from end user media service access devices and providing the media resource locator data to the end user media service access devices in response to the request;
   updating, by the monitoring probe based on the testing of the network services, the test configuration data to include the operational statuses of the network services;
   accessing, by the monitoring probe, the media resource locator file from the media resource locator address, the media resource locator file indicating a set of additional network services that is associated with the media resource locator service and that is not indicated in the test configuration data as being the network services to be tested, the set of additional network services comprising at least one of a multicast network service and a unicast network service;
   parsing, by the monitoring probe, the media resource locator file to identify:
      the set of additional network services including the at least one of the multicast network service and the unicast network service indicated in the media resource locator file but that were not indicated in the test configuration data accessed from the control server as being the network services to be tested,
      service types of the set of additional network services, and
      resource addresses for the set of additional network services;
   updating, by the monitoring probe based on the parsing of the media resource locator file, the test configuration data to include the set of additional network services including the at least one of the multicast network service and the unicast network service as being network services to be tested in addition to the set of network services;
   testing, by the monitoring probe, the set of additional network services including the at least one of the multicast network service and the unicast network service;
   determining, by the monitoring probe and based on the testing of the set of additional network services, operational statuses of the set of additional network services including the at least one of the multicast network service and the unicast network service;
   updating, by the monitoring probe based on the testing of the set of additional network services, the test configuration data to include the operational statuses of the set of additional network services including the at least one of the multicast network service and the unicast network service; and reporting, by the monitoring probe, the updated test configuration data including the operational statuses of the set of network services and the set of additional network services to the control server, wherein, when the set of additional network services includes the multicast network service to be tested, the testing of the multicast network service comprises:

sending a join request to a resource address for the multicast network service; and determining whether a multicast data packet is received from the resource address for the multicast network service within a predefined time period after the sending of the join request, and the method further comprises determining, by the monitoring probe, whether the multicast network service is operational based on whether the multicast data packet is received within the predefined time period after the sending of the join request.

2. The method of claim 1, wherein the updating of the test configuration data based on the parsing of the media resource locator file comprises adding, by the monitoring probe, within the test configuration data:

the service types of the set of additional network services to the service types of the set of network services; and the resource addresses for the set of additional network services to the resource addresses for the set of network services.

3. The method of claim 1, wherein:

the set of additional network services includes the multicast network service to be tested;

the service types of the set of additional network services include a multicast service type for the multicast network service; and the resource addresses of the set of additional network services include the resource address for the multicast network service.

4. The method of claim 3, wherein the determining whether the multicast network service is operational includes determining that an operational status of the multicast network service is operational in response to the multicast data packet being received from the resource address for the multicast network service within the predefined time period after the sending of the join request, and determining that the operational status of the multicast network service is not operational in response to the multicast data packet not being received from the resource address for the multicast network service within the predefined time period after the sending of the join request.

5. The method of claim 3, wherein the resource address for the multicast network service indicates a network address for a multicast carousel that multicasts a code image for download by an end-user media service access device.

6. The method of claim 1, embodied as computer-executable instructions on at least one non-transitory computer-readable medium.

7. The method of claim 1, further comprising:

continuously monitoring, by the monitoring probe, the media resource locator network service;

detecting, by the monitoring probe, a change in the media resource locator network service;

logging, by the monitoring probe, the detected change in the media resource locator network service; and saving, by the monitoring probe, a copy of the detected change in the media resource locator network service.

8. The method of claim 7, wherein the detected change in the media resource locator network service comprises a new media resource locator file.

9. The method of claim 1, wherein:

the set of network services to be tested includes a digital storage media command and control multicast carousel; and the method further comprises:

continuously monitoring, by the monitoring probe, the digital storage media command and control multicast carousel;

detecting, by the monitoring probe, a change in the digital storage media command and control multicast carousel; and saving, by the monitoring probe, a copy of the detected change in the digital storage media command and control multicast carousel.

10. A method comprising:

receiving, by a control server from a monitoring probe deployed in a media service network that provides a set of network services, via a plurality of network service devices, to a plurality of end users, a first request for test configuration data;

providing, by the control server in response to the first request, the test configuration data to the monitoring probe for use by the monitoring probe to test the set of network services, the test configuration data indicating the set of network services to be tested, service types of the network services, and resource addresses for the network services, wherein:

the set of network services includes a media resource locator network service to be tested, the service types of the network services include a media resource locator service type for the media resource locator network service, the resource addresses for the network services include a media resource locator address for a media resource locator server that provides the media resource locator network service, wherein the media resource locator server provides the media resource locator network service in support of at least one of the set of network services by receiving a second request for media resource locator data from end user media service access devices and providing the media resource locator data to the end user media service access devices in response to the second request, and the media resource locator network service, the media resource locator service type of the media resource locator network service, and the media resource locator address for the media resource locator server are configured for use by the monitoring probe to:

test the network services to determine operational statuses of the network services, update, based on the testing of the network services, the test configuration data to include the operational statuses of the network services;

parse a media resource locator file accessed from the media resource locator address of the media resource locator server to identify a set of additional network services to be tested, the set of additional network services indicated in the media resource locator file including network services that are associated with the media resource locator service and that were not indicated in the test configuration data as being the network services to be tested, the set of additional network services comprising at least one of a multicast network service and a unicast network service, update, based on the parsing of the media resource locator file, the test configuration data to include the set of additional network services including the at least one of the multicast network service and the unicast network service as being network services to be tested in addition to the set of network services, test the set of additional network services including the at least one of the multicast network service and the unicast network service, determine, based on the testing of the set of additional network services, operational statuses of the set of additional network services including the at least one of the multicast network service and the unicast network service, and update, based on the testing of the set of additional network services, the test configuration data to include the operational statuses of the set of additional network services including the at least one of the multicast network service and the unicast network service; and receiving, by the control server from the monitoring probe, the updated test configuration data that includes test results data indicating the operational statuses of the set of network services and the set of additional network services including the at least one of the multicast network service and the unicast network service, the operational statuses of the set of network services comprising an operational status of the media resource locator network service, wherein, when the set of additional network services includes the multicast network service to be tested, the testing of the multicast network service comprises:

sending a join request to a resource address for the multicast network service; and determining whether a multicast data packet is received from the resource address for the multicast network service within a predefined time period after the sending of the join request, and the monitoring probe determines whether the multicast network service is operational based on whether the multicast data packet is received within the predefined time period after the sending of the join request.

11. The method of claim 10, wherein:
the set of additional network services includes the multicast network service, which is provided by a multicast carousel deployed in the media service network; and
the operational statuses for the set of additional network services include an operational status of the multicast network service.

12. The method of claim 10, further comprising:
providing, by the control server in response to the request, a test interval instruction to the monitoring probe for use by the monitoring probe to determine how frequently to initiate a test session, the test session including a check by the monitoring probe for additional updated test configuration data from the control server.

13. The method of claim 10, embodied as computer-executable instructions on at least one non-transitory computer-readable medium.

14. A system comprising:
a control server connected to a media service network that provides a set of network services, via a plurality of network service devices, to a plurality of end users; and
a monitoring probe deployed in the media service network, configured to communicate with the control server, and that:

accesses test configuration data from the control server, the test configuration data indicating the set of network services to be tested, service types of the network services, and resource addresses for the network services, wherein:

the set of network services includes a media resource locator network service to be tested, the service types of the network services include a media resource locator service type for the media resource locator network service, and the resource addresses for the network services include a media resource locator address for a media resource locator server that provides the media resource locator network service;

tests the network services based on the test configuration data to determine operational statuses of the network services and to determine whether a media resource locator file is accessible at the media resource locator address of the media resource locator server, wherein the media resource locator server provides the media resource locator network service in support of at least one of the set of network services by receiving a request for media resource locator data from end user media service access devices and providing the media resource locator data to the end user media service access devices in response to the request;

updates, based on the testing of the network services, the test configuration data to include the operational statuses of the network services;

accesses the media resource locator file from the media resource locator address, the media resource locator file including a set of additional network services that is associated with the media resource locator service and that is not indicated in the test configuration data as being the network services to be tested, the set of additional network services comprising at least one of a multicast network service and a unicast network service;

parses the media resource locator file to identify:
the set of additional network services including the multicast network service and the unicast network service that are indicated in the media resource locator file but that were not indicated in the test configuration data accessed from the control server as being the network services to be tested, service types of the set of additional network services, and resource addresses for the set of additional network services;

updates, based on the parsing of the media resource locator file, the test configuration data to include the set of additional network services including the at least one of the multicast network service and the unicast network service as being network services to be tested in addition to the set of network services;

tests the set of additional network services including the at least one of the multicast network service and the unicast network service;

determines operational statuses of the set of additional network services including the at least one of the multicast network service and the unicast network service based on the testing of the set of additional network services;

updates, based on the testing of the set of additional network services, the test configuration data to include the operational statuses of the set of additional network services including the at least one of the multicast network service and the unicast network service; and reports the updated test configuration data including the operational statuses of the set of network services and the set of additional network services to the control server, wherein, when the set of additional network services includes the multicast network service to be tested, the testing of the multicast network service comprises:

sending a join request to a resource address for the multicast network service; and determining whether a multicast data packet is received from the resource address for the multicast network service within a predefined time period after the sending of the join request, and the monitoring probe determines whether the multicast network service is operational based on whether the multicast data packet is received within the predefined time period after the sending of the join request.

15. The system of claim 14, wherein the updating of the test configuration data based on the parsing of the media resource locator file includes the monitoring probe adding, within the test configuration data:

the service types of the set of additional network services to the service types of the set of network services; and the resource addresses for the set of additional network services to the resource addresses for the set of network services.

16. The system of claim 14, wherein:

the set of additional network services includes the multicast network service to be tested;

the service types of the set of additional network services include a multicast service type for the multicast network service; and the resource addresses of the set of additional network services include the resource address for the multicast network service.

17. The system of claim 16, wherein the resource address for the multicast network service indicates a network address for a multicast carousel that multicasts a code image for download by an end-user media service access device.

18. The system of claim 14, wherein the monitoring probe:

continuously monitors the media resource locator network service;

detects a change in the media resource locator network service;

saves a copy of the detected change in the media resource locator network service; and reports the detected change in the media resource locator network service to the control server.

19. The system of claim 18, wherein the detected change in the media resource locator network service comprises a new media resource locator file.

20. The system of claim 14, wherein:

the set of network services to be tested includes a digital storage media command and control multicast carousel; and the monitoring probe:

continuously monitors the digital storage media command and control multicast carousel;

detects a change in the digital storage media command and control multicast carousel; and saves a copy of the detected change in the digital storage media command and control multicast carousel.

* * * * *